(12) United States Patent
Nagane et al.

(10) Patent No.: US 10,882,480 B2
(45) Date of Patent: Jan. 5, 2021

(54) VEHICLE BODY STRUCTURE (71) Applicant: HONDA MOTOR CO., LTD., Tokyo (JP)

(72) Inventors: Yoshinari Nagane, Wako (JP); Kazuya Ban, Wako (JP); Kenichi Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 16/019,912

(22) Filed: Jun. 27, 2018

(65) Prior Publication Data
US 2019/0009741 A1 Jan. 10, 2019

(30) Foreign Application Priority Data

Jul. 7, 2017 (JP) ................................. 2017-133936

(51) Int. Cl.
*B60R 19/24* (2006.01)
*B60R 19/48* (2006.01)
*B60R 13/04* (2006.01)
*B60R 19/02* (2006.01)

(52) U.S. Cl.
CPC .............. *B60R 19/24* (2013.01); *B60R 13/04* (2013.01); *B60R 19/023* (2013.01); *B60R 19/48* (2013.01); *B60R 2019/247* (2013.01)

(58) Field of Classification Search
CPC ....... B60R 19/24; B60R 13/04; B60R 19/023; B60R 19/48
USPC ......................................................... 293/117
See application file for complete search history.

(56) References Cited

U.S. PATENT DOCUMENTS

| 8,632,107 | B2 | 1/2014 | Hirose | |
|---|---|---|---|---|
| 2008/0088141 | A1* | 4/2008 | Adachi | B60R 19/50 |
| | | | | 293/1 |
| 2013/0127187 | A1* | 5/2013 | Hirose | B60Q 1/30 |
| | | | | 293/102 |

FOREIGN PATENT DOCUMENTS

| EP | 1876054 A1 | 1/2008 |
|---|---|---|
| JP | H10-338093 A | 12/1998 |
| JP | 2003-312402 A | 11/2003 |
| JP | 2013-107494 A | 6/2013 |

OTHER PUBLICATIONS

Japanese Office Action (w/ partial translation) issued for Japanese Patent Application No. 2017-133936 dated May 27, 2019.

* cited by examiner

*Primary Examiner* — Joseph D. Pape
(74) *Attorney, Agent, or Firm* — Thomas | Horstemeyer, LLP (57) ABSTRACT

The present invention provides a vehicle body structure comprising an exterior component configured to form an outer surface of a vehicle body and provided with an opening portion; and an attachment component attached on a vehicle body inner side of the exterior component with respect to the opening portion, wherein the exterior component includes an extended portion extended from a periphery of the opening portion toward the vehicle body inner side, and the extended portion includes an abutted portion configured to restrict a displacement of the attachment component to the vehicle body inner side by abutment against an abutment portion provided on the attachment component.

15 Claims, 7 Drawing Sheets

VEHICLE BODY STRUCTURE

BACKGROUND OF THE INVENTION

Field of the Invention

The present invention relates to a vehicle body structure.

Description of the Related Art

Japanese Patent Laid-Open No. 2003-312402 discloses a structure that attaches a fog lamp (attachment component) on the vehicle body inner side of a bumper serving as an exterior component of a vehicle body.

In the attachment component attached to the exterior component as disclosed in Japanese Patent Laid-Open No. 2003-312402, a wobble readily occurs in a portion that is not fixed to the exterior component by a bolt or the like. Depending on the shape of the exterior component or the attachment component, it is sometimes impossible to increase the number of portions fixed by bolts or the like.

SUMMARY OF THE INVENTION

The present invention, for example, reduces a wobble of an attachment component attached to an exterior component even if the number of portions fixed by bolts or the like cannot be increased.

According to one aspect of the present invention, there is provided a vehicle body structure comprising: an exterior component configured to form an outer surface of a vehicle body and provided with an opening portion; and an attachment component attached on a vehicle body inner side of the exterior component with respect to the opening portion, wherein the exterior component includes an extended portion extended from a periphery of the opening portion toward the vehicle body inner side, and the extended portion includes an abutted portion configured to restrict a displacement of the attachment component to the vehicle body inner side by abutment against an abutment portion provided on the attachment component.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. Note that the same reference numerals denote the same members throughout the drawings, and a repetitive description thereof will not be given.

A vehicle body structure according to the embodiment of the present invention will be described below. In the following embodiment, an example in which a reflector serving as an attachment component is attached on the vehicle body inner side of a rear bumper serving as an exterior component that forms the outer surface of a vehicle body will be described. However, the present invention is not limited to the rear bumper and the reflector and can be applied to any structure that attaches an attachment component on the vehicle body inner side of an exterior component. In drawings to be explained below, an arrow FR represents the longitudinal direction of a vehicle body (vehicle), and FT indicates the front side; and RR, the rear side. An arrow W represents the vehicle width direction, and LT indicates the left side; and RT, the right side in the forward moving direction of the vehicle. An arrow H represents the vertical direction, and UR indicates the upper side; and LR, the lower side.

Figure 1:
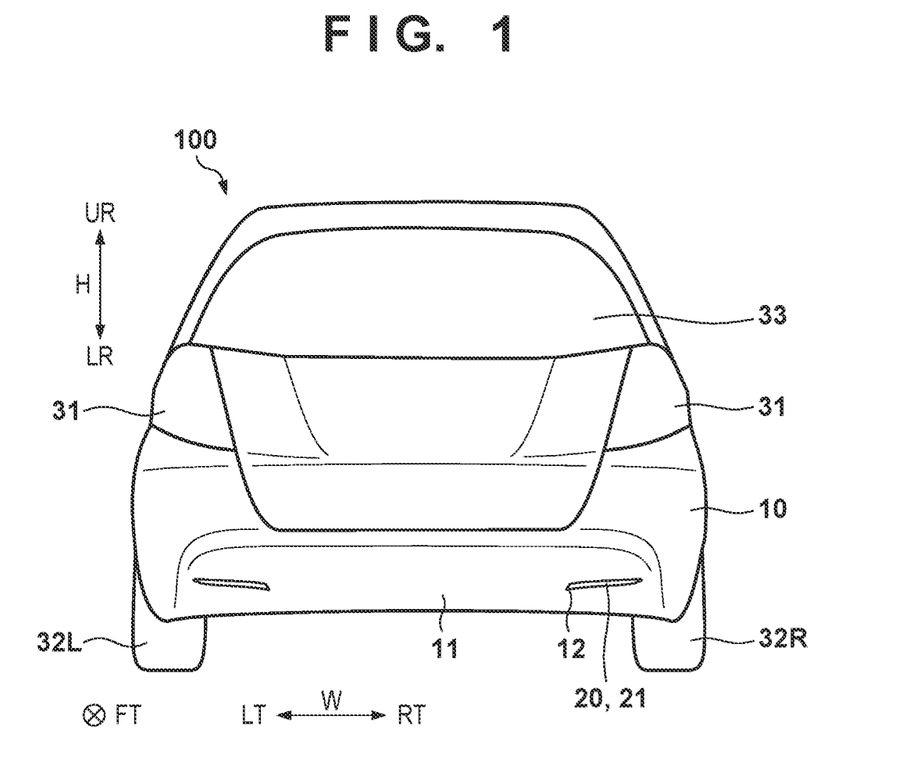
FIG. 1 is a view showing a vehicle body viewed from a rear side.
Figure 2:
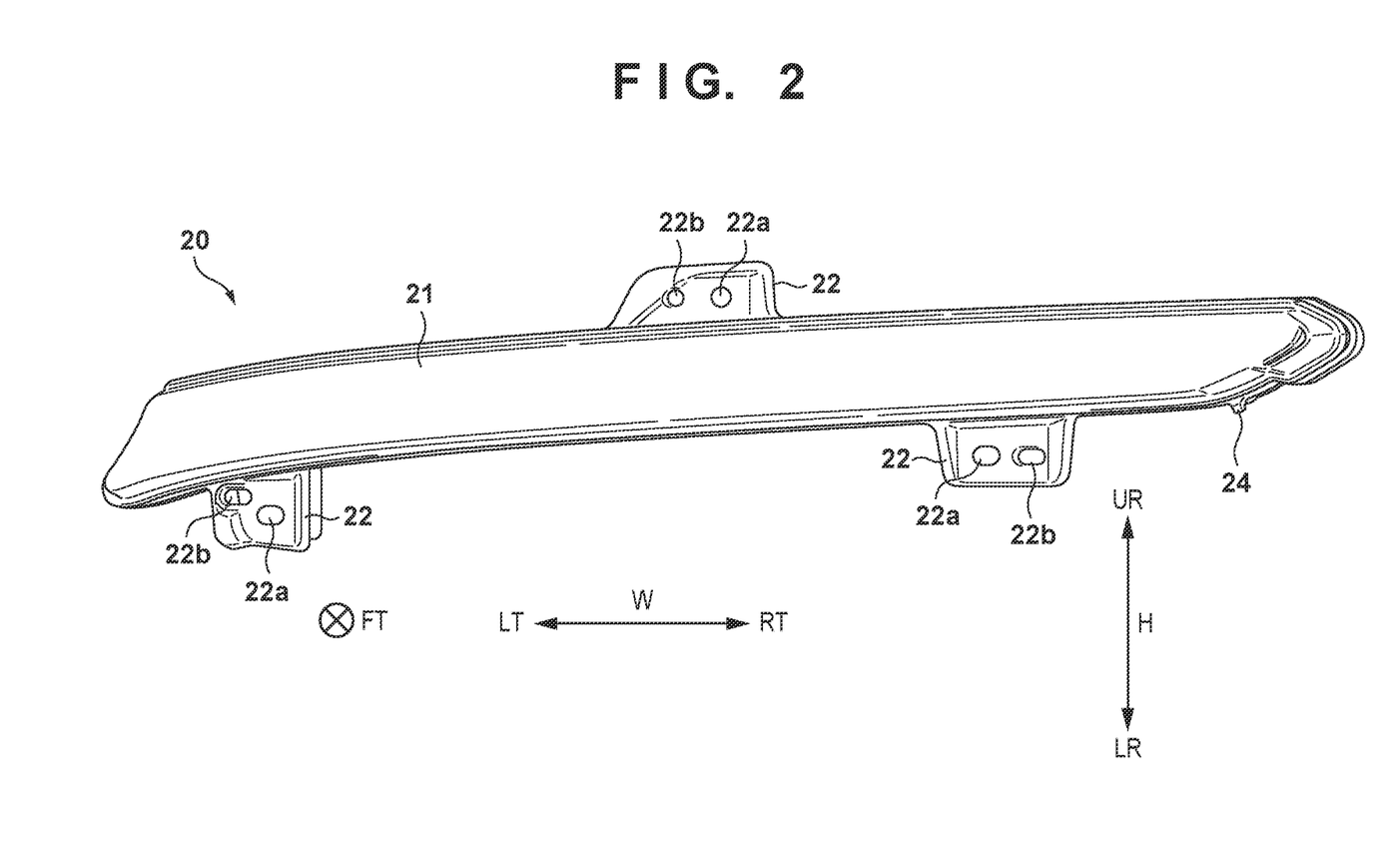
FIG. 2 is a view showing only a reflector viewed from the rear side.

FIG. 1 is a view showing a vehicle body 100 viewed from the rear side. FIG. 1 shows a rear bumper 10 (to be referred to as a bumper 10 hereinafter) extending in the vehicle width direction, left and right reflectors 20 provided in the bumper 10, left and right rear lamps 31 provided on the upper side of the bumper 10, left and right rear wheels 32L and 32R, and a rear glass 33. The bumper 10 includes a surface portion 11 that forms the outer surface of the vehicle body 100, and opening portions 12 each having a long hole shape and formed in the surface portion 11. The reflectors 20 reflect light (that is, light from a following vehicle) that enters from the outside of the vehicle body 100 via the opening portions 12. Each reflector 20 includes a reflecting surface 21 that reflects light, and is attached on the vehicle body inner side (inner side) of the bumper 10 with respect to the opening portion 12 such that the reflecting surface 21 is exposed from the opening portion 12 provided in the bumper 10. Here, the reflector 20 (opening portion 12) according to this embodiment has a long shape whose longitudinal direction is set along the vehicle width direction, as shown in FIGS. 1 and 2. However, the reflector 20 may have a long shape whose longitudinal direction is set along the vertical direction of the vehicle body, and the shape can be an arbitrary shape. FIG. 2 is a view showing only the right reflector 20 viewed from the rear side.

Figure 3:
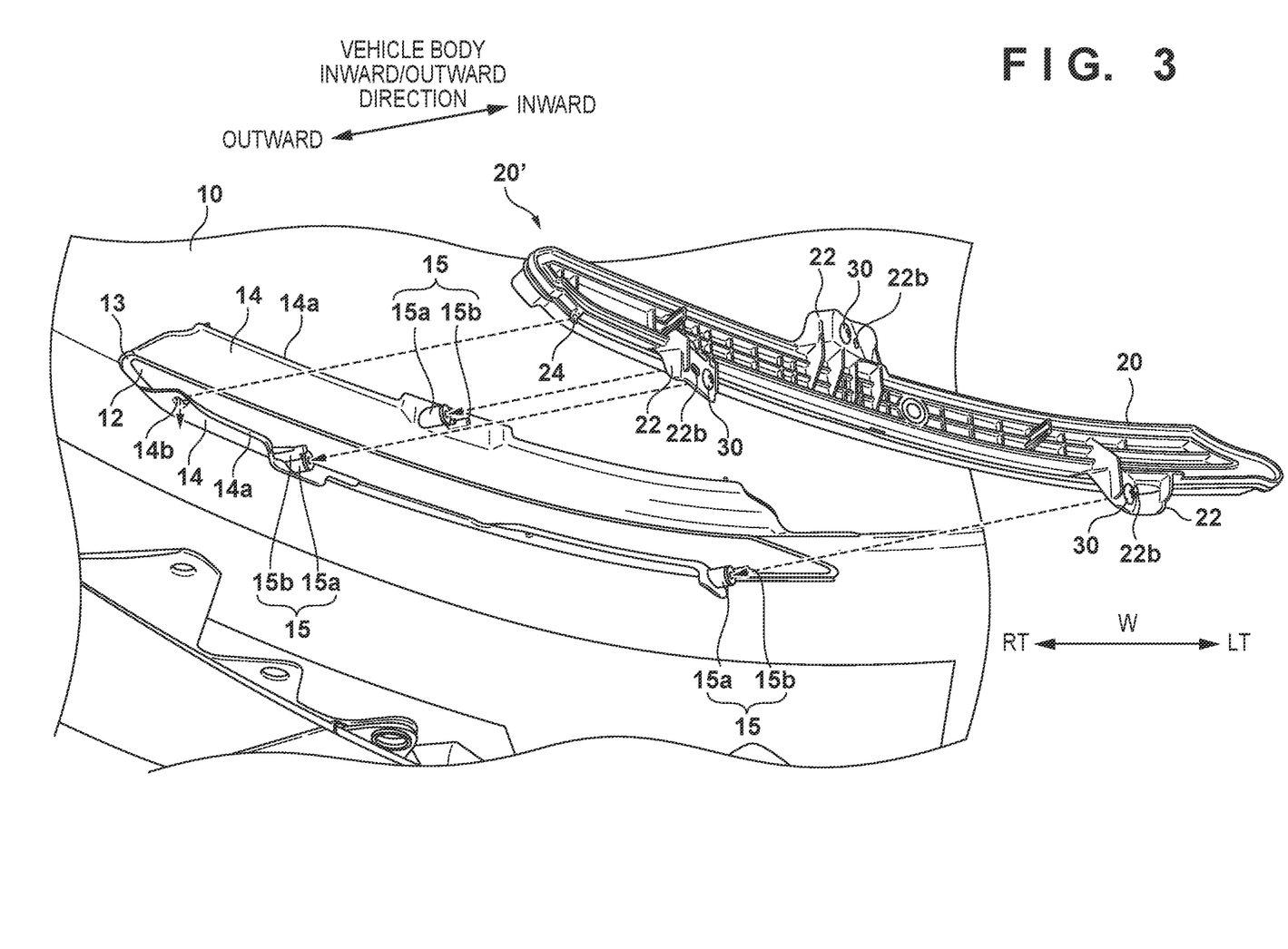
FIG. 3 is a view showing a state before the reflector is attached to the bumper.
Figure 4:
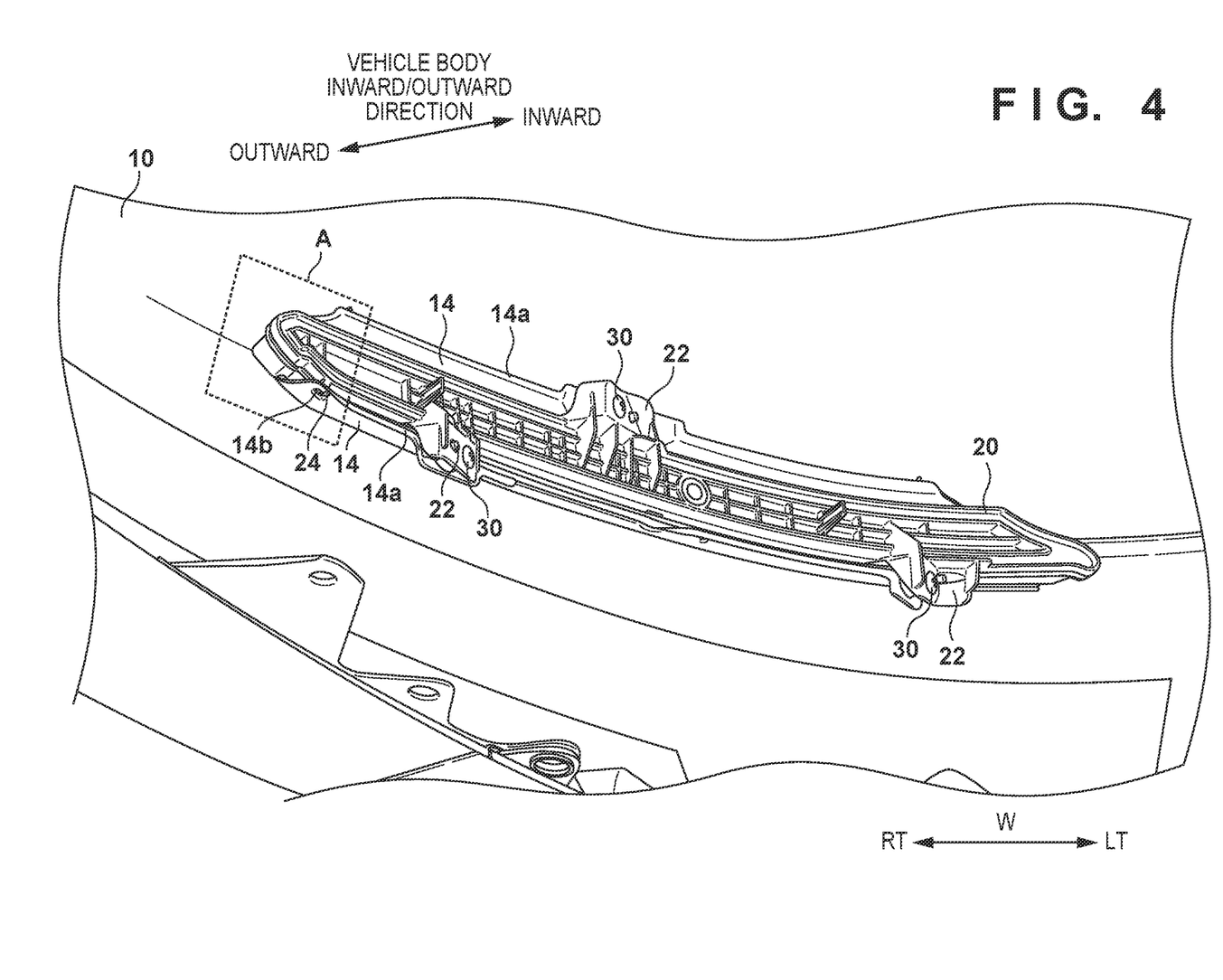
FIG. 4 is a view showing a state after the reflector is attached to the bumper.

A structure configured to attach the reflector 20 on the vehicle body inner side of the bumper 10 will be described next with reference to FIGS. 3 and 4. FIGS. 3 and 4 are views showing the bumper 10 and the reflector 20 viewed from the vehicle body inner side. FIG. 3 shows a state before the reflector 20 is attached to the bumper 10, and FIG. 4 shows a state after the reflector 10 is attached to the bumper 10.

The opening portion 12 configured to expose the reflecting surface 21 of the reflector 20 is provided in the bumper 10. An opening flange portion 13 bent to the vehicle body inner side is provided at the edge of the bumper 10 (surface portion 11), which defines the opening portion 12. In addition, the bumper 10 is provided with, for example, extended portions 14 extended from the periphery of the opening portion 12 (the base of the opening flange portion 13) toward the vehicle body inner side so as to sandwich the reflector 20 from both sides of the reflector 20 in the widthwise direction. Each extended portion 14 includes, at the end on the vehicle body inner side, a flange portion 14a extending in a direction (for example, the vertical direction of the vehicle body) crossing the inward/outward direction of the vehicle body. The flange portion 14a is provided with an attachment portion 15 used to attach the reflector 20.

The attachment portion 15 can include, for example, a fixing portion 15a that fixes (supports) a fixed portion 22 by a screw 30 (or a bolt) or the like via a hole 22a provided in the fixed portion 22 of the reflector 20, and a projecting portion 15b inserted into a hole 22b provided in the fixed portion 22 of the reflector 20. When attaching the reflector 20 to the bumper 10, as shown in FIGS. 3 and 4, the projecting portion 15b is inserted into the hole 22b of the fixed portion 22 to position the reflector 20 with respect to the bumper 10 (opening portion 12), and in this state, the fixed portion 22 is fixed (supported) to the fixing portion 15a by the screw 30.

In such a structure, conventionally, since the reflector 20 is not in contact with the extended portion 14 (bumper 10) at portions other than the fixed portions 22 fixed by the fixing portions 15a, a "wobble" occurs in the portions other than the fixed portions 22. For example, as shown in FIGS. 3 and 4, an end 20' of the reflector 20 in the longitudinal direction is not fixed to the bumper 10 by the fixing portion 15a. For this reason, if a force in the inward/outward direction of the vehicle body is applied to the end 20', the end 20' is displaced (wobbles) in the inward/outward direction of the vehicle body 100. In the vehicle body structure according to this embodiment, however, an abutment portion 24 that abuts against the extended portion 14 of the bumper 10 so as to restrict (limit) the displacement of the reflector 20 in the inward/outward direction (in particular, to the vehicle body inner side) of the vehicle body is provided at a portion of the reflector 20 other than the fixed portions 22, thereby reducing the wobble of the reflector 20. A detailed structure configured to reduce the wobble of the reflector 20 will be described below.

Figure 5:
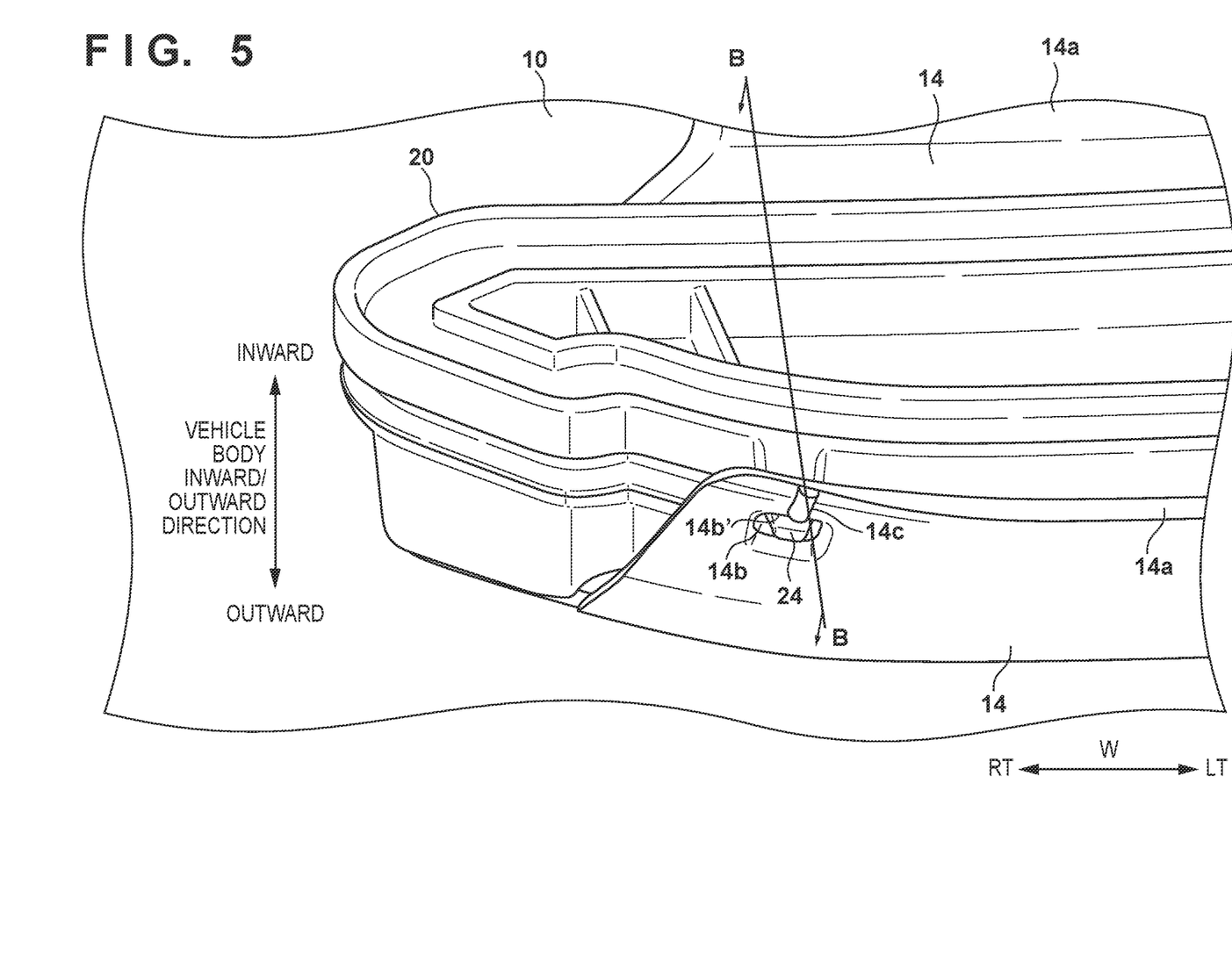
FIG. 5 is an enlarged view of a region A in FIG. 4.
Figure 6:
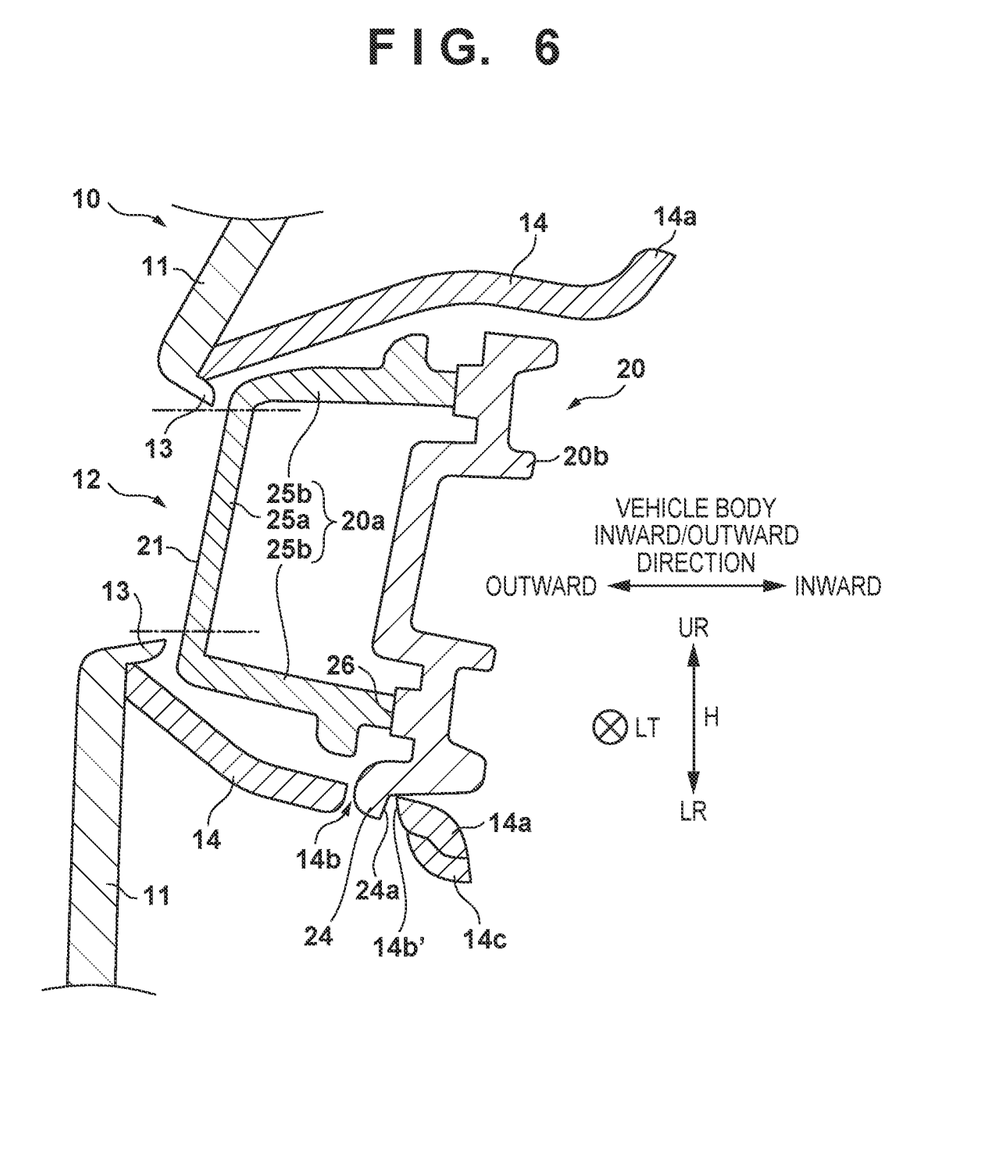
FIG. 6 is a sectional view in a direction B in FIG. 5.

FIG. 5 is an enlarged view of a region A in FIG. 4. FIG. 6 is a sectional view in a direction B in FIG. 5. As shown in FIGS. 5 and 6, the abutment portion 24 of the reflector 20 has a projection shape, an insertion hole (engaging hole) 14b in which the abutment portion 24 is inserted is provided in the extended portion 14 of the bumper 10 at a position corresponding to the abutment portion 24 of the reflector 20. The reflector 20 is attached to the bumper 10 in a state in which the abutment portion 24 of the reflector 20 is inserted into the insertion hole 14b of the extended portion 14 of the bumper 10. Accordingly, even if a force in the inward/outward direction of the vehicle body is applied to the reflector 20, the wobble of the reflector 20 can be reduced by the abutment between an edge 14b' (abutted portion) of the insertion hole 14b on the vehicle body inner side and the abutment portion 24 (surface 24a) of the reflector 20.

As described above, in the vehicle body structure according to this embodiment, the abutment portion 24 of the reflector 20 (the flange portion 14a (abutted portion) of the bumper 10) is provided while being spaced part from the fixed portion 22 of the reflector 20 (the fixing portion 15a of the bumper 10) in the longitudinal direction of the reflector 20 (opening portion 12). This makes it possible to support a portion such as the end 20' of the reflector 20, which is not fixed by the fixing portion 15a and readily causes a "wobble", by the bumper 10 (extended portion 14) and reduce the "wobble" of the portion.

Here, the extended portion 14 and the reflector 20 may be configured such that the edge 14b' of the insertion hole 14b and the surface 24a of the abutment portion 24 always abut against each other before the force in the inward/outward direction of the vehicle body is applied to the reflector 20, or may be configured such that the edge 14b' of the insertion hole 14b and the surface 24a of the abutment portion 24 abut against each other when the force is applied to the reflector 20.

Additionally, a rib 14c can be provided between the insertion hole 14b and the flange portion 14a on the outer surface (the surface on the opposite side of the surface on the side of the reflector 20) of the extended portion 14 of the bumper 10. The rib 14c has a shape extending in the inward/outward direction of the vehicle body so as to connect an edge 14b' of the insertion hole 14b and the flange portion 14a and is connected to the flange portion 14a. When the rib 14c with such a shape is provided on the extended portion 14, bending of the extended portion 14, which occurs when the edge 14b' of the insertion hole 14b is pressed by the abutment portion 24 of the reflector 20, can be reduced. The rib 14c according to this embodiment has a columnar shape. However, the present invention is not limited to this, and an arbitrary shape can be employed.

Figure 7:
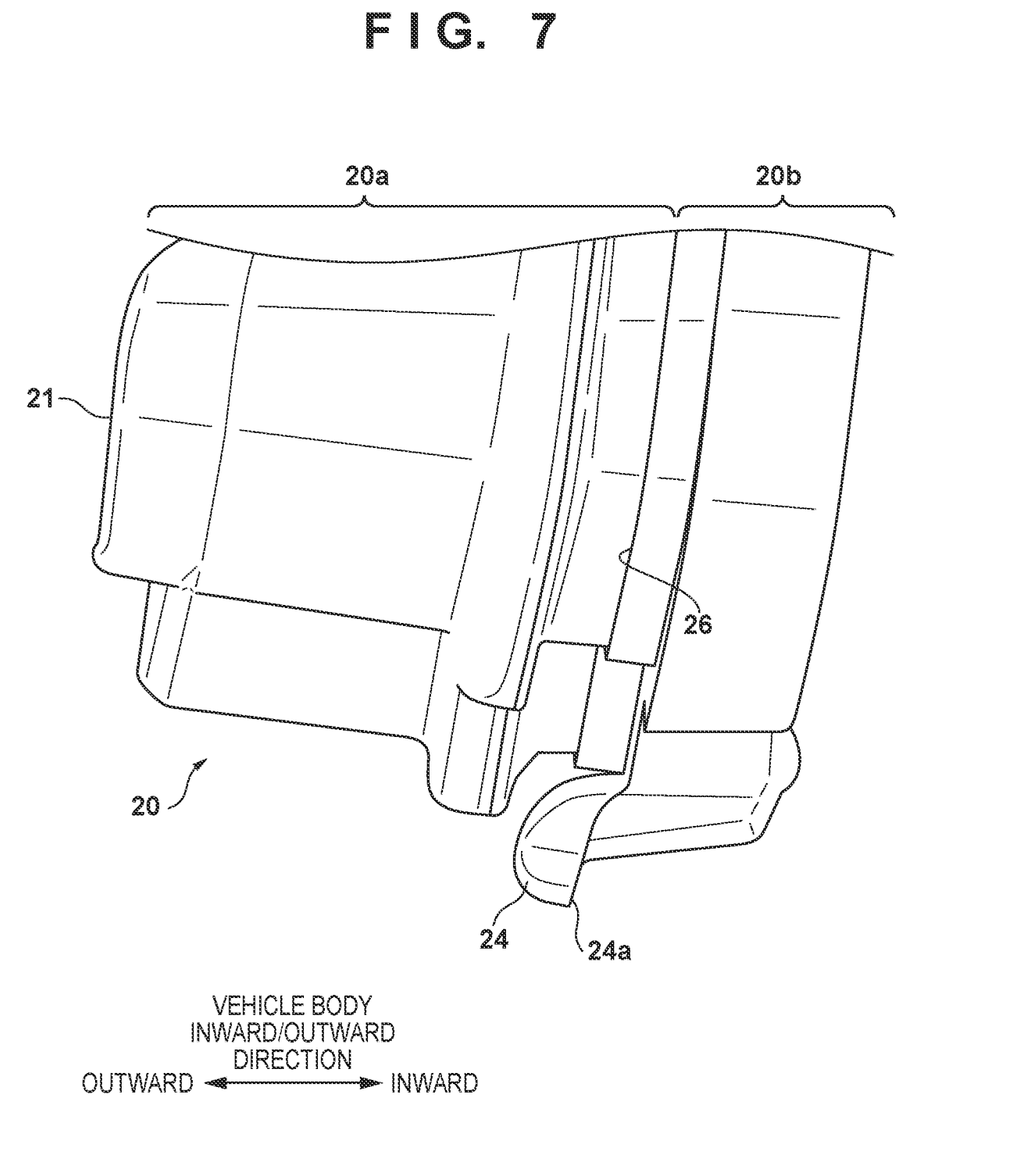
FIG. 7 is an enlarged view of a portion of the reflector near the abutment portion.

A detailed arrangement of the reflector 20 will be described next with reference to FIGS. 6 and 7. FIG. 7 is an enlarged view of a portion of the reflector 20 near the abutment portion 24. The reflector 20 can include a reflecting portion 20a (reflector portion) including the reflecting surface 21 that reflects light, and a housing portion 20b to which the reflecting portion 20a is joined. The reflecting portion 20a includes a first portion 25a (exposed portion) including the reflecting surface 21 serving as an exposed surface exposed to the outside of the vehicle body via the opening portion 12, and a second portion 25b (side wall portion) extending from an end of the first portion 25a toward the vehicle body inner side. In addition, the abutment portion 24 inserted into the insertion hole 14b of the extended portion 14 includes the surface 24a (abutment surface) that abuts against the edge 14b' of the insertion hole 14b on the vehicle body inner side and is provided on the housing portion 20b.

The reflecting portion 20a and the housing portion 20b are individually manufactured by, for example, injection molding and joined by welding. For example, the housing portion 20b can be manufactured by injection molding using at least two molds. The injection molding can generally increase the strength of a portion corresponding to the parting lines of at least two molds in a molded article and can also increase the flatness. In the housing portion 20b, a joint surface 26 to which the reflecting portion 20a is joined and the surface 24a of the abutment portion 24 are required to have a strength and flatness. For this reason, when manufacturing the housing portion 20b by injection molding, the joint surface 26 and the surface 24a of the abutment portion 24 can be made to correspond to the parting lines. In the thus manufactured housing portion 20b, the abutment portion 24 can be arranged on the vehicle body outer side (the side of the reflecting portion 20a) of the joint surface 26. Here, the rigidity (strength) of the extended portion 14 of the bumper 10 becomes high toward the surface portion 11. For this reason, when the abutment portion 24 is arranged on the vehicle body outer side of the joint surface 26 to make the position where the abutment portion 24 is abutted against the extended portion 14 close to the outer surface of the bumper 10, the wobble of the reflector 20 can effectively be reduced.

A preferable positional relationship between the bumper 10 and the reflector 20 attached to it will be described here with reference to the sectional view shown in FIG. 6. As shown in FIG. 6, the opening flange portion 13 of the bumper 10 can be formed to cover the ends of the reflecting surface 21 of the reflector 20 when viewed from the outer side (for example, the rear side) of the vehicle body 100. For example, the opening flange portion 13 of the bumper 10 can be formed to overlap the second portions 25b of the reflecting portion 20a of the reflector 20 when viewed from the outer side of the vehicle body 100. This can make the shape of the reflecting surface 21 visible from the outer side (rear side) of the vehicle body 100 thinner and can also make the inside (the extended portion 14 and the like) of the bumper 10 hard to see via the opening portion 12 from the outer side of the vehicle body 100, resulting in improvement of design.

Summary of Embodiment

1. According to the above embodiment, there is provided a vehicle body structure comprising an exterior component (for example, 10) configured to form an outer surface of a vehicle body and provided with an opening portion (for example, 12), and an attachment component (for example, 20) attached on a vehicle body inner side of the exterior component with respect to the opening portion, wherein the exterior component includes an extended portion (for example, 14) extended from a periphery of the opening portion toward the vehicle body inner side, and the extended portion includes an abutted portion (for example, 14b') configured to restrict a displacement of the attachment component to the vehicle body inner side by abutment against an abutment portion (for example, 24) provided on the attachment component. According to this embodiment, it is possible to reduce a wobble of the attachment component attached to the exterior component.

2. In the above embodiment, the extended portion includes an insertion hole (for example, 14b) into which the abutment portion is inserted, and the abutted portion includes an edge (for example, 14b') of the insertion hole. According to this embodiment, a wobble of the attachment component can be reduced by a simple arrangement.

3. In the above embodiment, the extended portion includes a rib (for example, 14c) extending from the edge of the insertion hole to the vehicle body inner side. According to this embodiment, bending of the extended portion, which occurs when the edge of the insertion hole provided in the extended portion is pressed by the abutment portion of the attachment component, can be reduced.

4. In the above embodiment, the extended portion includes a flange portion (for example, 14a) on the vehicle body inner side. According to this embodiment, since the bending of the extended portion is reduced, the effect of reducing the wobble of the attachment component by the abutment portion can further be enhanced.

5. In the above embodiment, the extended portion includes a flange portion on the vehicle body inner side, and the rib is connected to the flange portion of the extended portion. According to this embodiment, bending of the extended portion can further be reduced.

6. In the above embodiment, the extended portion includes a fixing portion (for example, 15a) configured to fix the attachment component, and the fixing portion is provided on the flange portion. According to this embodiment, as compared to a case in which the fixing portion is directly provided on the surface portion of the exterior component, a sink that occurs in the surface portion can be reduced.

7. In the above embodiment, the attachment component includes a first portion (for example, 25a) including an exposed surface (for example, 21) exposed to an outside of the vehicle body via the opening portion, and a second portion (for example, 25b) extending from an end of the first portion to the vehicle body inner side, and an edge of the exterior component, which defines the opening portion, overlaps the second portion when viewed from an outer side of the vehicle body. According to this embodiment, it is possible to make the shape of the exposed surface visible from the outer side of the vehicle body thinner and make the inside of the exterior component hard to see via the opening portion from the outer side of the vehicle body, resulting in improvement of design.

8. In the above embodiment, the attachment component includes a reflecting surface (for example, 21) configured to reflect light that enters from an outside of the vehicle body via the opening portion, and an edge of the exterior component, which defines the opening portion, covers an end of the reflecting surface when viewed from the outer side of the vehicle body. According to this embodiment, it is possible to make the shape of the reflecting surface visible from the outer side of the vehicle body thinner and make the inside of the exterior component hard to see via the opening portion from the outer side of the vehicle body, resulting in improvement of design.

9. In the above embodiment, an edge of the exterior component, which defines the opening portion, includes a flange portion (for example, 13) bent to the vehicle body inner side. According to this embodiment, it is possible to make the inside of the exterior component hard to see via the opening portion from the outer side of the vehicle body, resulting in improvement of design.

10. In the above embodiment, the attachment component includes a reflector portion (for example, 20a) including a reflecting surface configured to reflect light, and a housing portion (for example, 20b) to which the reflector portion is joined, and the abutment portion is provided on the housing portion. According to this embodiment, it is possible to reduce the strain of the reflecting surface caused by a reaction force from the abutment portion.

11. In the above embodiment, the housing portion includes a joint surface (for example, 26) to which the reflector portion is joined, and the abutment portion is located on a vehicle body outer side of the joint surface. According to this embodiment, it is possible to make the position where the abutment portion is abutted against the extended portion close to the outer surface of the exterior component and effectively reduce the wobble of the attachment component.

12. In the above embodiment, the abutment portion includes, on the vehicle body inner side, an abutment surface (for example, 24a) configured to abut against the abutted portion of the extended portion. According to this embodiment, it is possible to increase the strength of the abutment portion and effectively reduce the wobble of the attachment component.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133936 filed on Jul. 7, 2017, which is hereby incorporated by reference herein in its entirety.

What is claimed is:

1. A vehicle body structure comprising:
an exterior component configured to form an outer surface of a vehicle body and provided with an opening portion; and
an attachment component attached on a vehicle body inner side of the exterior component with respect to the opening portion, wherein the exterior component includes a first extended portion and a second extended portion which are extended from a periphery of the opening portion toward the vehicle body inner side, the first extended portion and the second extended portion are arranged so as to sandwich the attachment component by each other, and each of the first extended portion and the second extended portion has a fixing portion configured to fix the attachment component, and the second extended portion includes an abutted portion configured to restrict a displacement of the attachment component to the vehicle body inner side by abutment against an abutment portion provided on the attachment component, the abutted portion being arranged apart from the fixing portion on the second extended portion.

2. The structure according to claim 1, wherein
the second extended portion includes an insertion hole into which the abutment portion is inserted, and
the abutted portion includes an edge of the insertion hole.

3. The structure according to claim 2, wherein the second extended portion includes a rib extending from the edge of the insertion hole to the vehicle body inner side.

4. The structure according to claim 1, wherein each of the first extended portion and the second extended portion includes a flange portion on the vehicle body inner side.

5. The structure according to claim 3, wherein
the second extended portion includes a flange portion on the vehicle body inner side, and
the rib is connected to the flange portion of the second extended portion.

6. The structure according to claim 4, wherein the fixing portion is provided on the flange portion.

7. The structure according to claim 1, wherein
the attachment component includes a first portion including an exposed surface exposed to an outside of the vehicle body via the opening portion, and a second portion extending from an end of the first portion to the vehicle body inner side, and
an edge of the exterior component, which defines the opening portion, overlaps the second portion when viewed from an outer side of the vehicle body.

8. The structure according to claim 1, wherein
the attachment component includes a reflecting surface configured to reflect light that enters from an outside of the vehicle body via the opening portion, and
an edge of the exterior component, which defines the opening portion, covers an end of the reflecting surface when viewed from the outer side of the vehicle body.

9. The structure according to claim 1, wherein an edge of the exterior component, which defines the opening portion, includes a flange portion bent to the vehicle body inner side.

10. The structure according to claim 1, wherein
the attachment component includes a reflector portion including a reflecting surface configured to reflect light, and a housing portion to which the reflector portion is joined, and
the abutment portion is provided on the housing portion.

11. The structure according to claim 10, wherein
the housing portion includes a joint surface to which the reflector portion is joined, and
the abutment portion is located on a vehicle body outer side of the joint surface.

12. The structure according to claim 11, wherein the abutment portion includes, on the vehicle body inner side, an abutment surface configured to abut against the abutted portion of the second extended portion.

13. The structure according to claim 1, wherein
the second extended portion has a plurality of the fixing portions,
the abutted portion is arranged at a position other than between the plurality of the fixing portions, on the second extended portion.

14. A vehicle body structure comprising:
an exterior component configured to form an outer surface of a vehicle body and provided with an opening portion; and
an attachment component attached on a vehicle body inner side of the exterior component with respect to the opening portion,
wherein the exterior component includes an extended portion extended from a periphery of the opening portion toward the vehicle body inner side,
the extended portion includes an abutted portion configured to restrict a displacement of the attachment component to the vehicle body inner side by abutment against an abutment portion provided on the attachment component,
the extended portion includes an insertion hole into which the abutment portion is inserted,
the abutted portion includes an edge of the insertion hole, and
the extended portion includes a rib extending from the edge of the insertion hole to the vehicle body inner side.

15. A vehicle body structure comprising:
an exterior component configured to form an outer surface of a vehicle body and provided with an opening portion; and
an attachment component attached on a vehicle body inner side of the exterior component with respect to the opening portion,
wherein the exterior component includes an extended portion extended from a periphery of the opening portion toward the vehicle body inner side,
the extended portion includes an abutted portion configured to restrict a displacement of the attachment component to the vehicle body inner side by abutment against an abutment portion provided on the attachment component,
the attachment component includes a reflecting surface configured to reflect light that enters from an outside of the vehicle body via the opening portion, and
an edge of the exterior component, which defines the opening portion, covers an end of the reflecting surface when viewed from the outer side of the vehicle body.

* * * * *